(12) United States Patent
Sinton et al.

(10) Patent No.: US 8,909,147 B2
(45) Date of Patent: Dec. 9, 2014

(54) APPARATUS AND METHOD FOR TRANSMISSION OF AUDIO SIGNALS

(75) Inventors: Lee Corey Sinton, Berkshire (GB); Neil Briffett, Surrey (GB)

(73) Assignee: Nokia Corporation, Espoo (FI)

( * ) Notice: Subject to any disclaimer, the term of this patent is extended or adjusted under 35 U.S.C. 154(b) by 822 days.

(21) Appl. No.: 12/144,583

(22) Filed: Jun. 23, 2008

(65) Prior Publication Data
US 2009/0318082 A1 Dec. 24, 2009

(51) Int. Cl.
H04W 48/00 (2009.01)
H04W 48/18 (2009.01)
H04W 88/06 (2009.01)

(52) U.S. Cl.
CPC .............. *H04W 48/18* (2013.01); *H04W 88/06* (2013.01)
USPC .......... 455/41.2; 455/41.3; 455/59; 455/66.1; 455/569.2; 455/569.1

(58) Field of Classification Search
CPC ...................................................... H04B 1/034
USPC .......... 455/41.2, 41.3, 59, 66.1, 569.1, 569.2
See application file for complete search history.

(56) References Cited

U.S. PATENT DOCUMENTS

| 7,257,398 | B1 * | 8/2007 | Ukita et al. .................... 455/420 |
| 8,285,205 | B2 | 10/2012 | Ibrahim et al. |
| 2004/0042413 | A1 * | 3/2004 | Kawamura et al. ........... 370/252 |
| 2004/0116141 | A1 | 6/2004 | Loven et al. |
| 2004/0224638 | A1 * | 11/2004 | Fadell et al. .................. 455/66.1 |
| 2006/0041615 | A1 | 2/2006 | Blank et al. |
| 2006/0056422 | A1 | 3/2006 | Berkvens |
| 2006/0084383 | A1 | 4/2006 | Ibrahim et al. |
| 2006/0270348 | A1 * | 11/2006 | Ibrahim et al. ............... 455/41.2 |
| 2006/0281477 | A1 * | 12/2006 | Downes ........................ 455/509 |
| 2007/0049197 | A1 * | 3/2007 | Klein ........................... 455/41.2 |
| 2007/0072582 | A1 | 3/2007 | Nurmi |
| 2007/0173294 | A1 | 7/2007 | Hsiung |
| 2008/0268781 | A1 * | 10/2008 | Chan ............................ 455/41.3 |
| 2009/0111389 | A1 * | 4/2009 | Grushkevich et al. .......... 455/77 |
| 2009/0247071 | A1 * | 10/2009 | Xhafa et al. .................. 455/11.1 |
| 2011/0053511 | A1 * | 3/2011 | De Weerd ..................... 455/41.3 |

FOREIGN PATENT DOCUMENTS

| CN | 1723667 A1 | 1/2006 |
| CN | 1723677 A1 | 1/2006 |
| CN | 1801809 A1 | 7/2006 |
| CN | 1881821 A1 | 12/2006 |
| EP | 1727291 A2 | 11/2006 |

(Continued)

OTHER PUBLICATIONS

D.M. Dobkin, "Engineering for Wireless Networks: Hardware, Antennas, and Propagation" Elsevier Inv., s005, ISBN 0-7506-7878-9, p. 93-96.

(Continued)

*Primary Examiner* — Wen Huang
(74) *Attorney, Agent, or Firm* — Locke Lord LLP

(57) ABSTRACT

In accordance with an example embodiment of the present invention, a method is presented which comprises searching for at least a device that is capable of a point-to-point transmission of media data. If such a device is not selected for the point-to-point transmission, a transmission of the media data is started on a second communication interface using a broadcast transmission.

26 Claims, 4 Drawing Sheets

(56) References Cited

FOREIGN PATENT DOCUMENTS

| EP | 1626541 | B1 | 11/2009 |
|----|---------|----|---------|
| WO | WO2004053655 | A2 | 6/2004 |
| WO | WO2004054190 | A1 | 6/2004 |

OTHER PUBLICATIONS

International Search Report and Written Opinion Issued in Related Case PCT/FI2009/05047, mailed on Oct. 14, 2009.

* cited by examiner

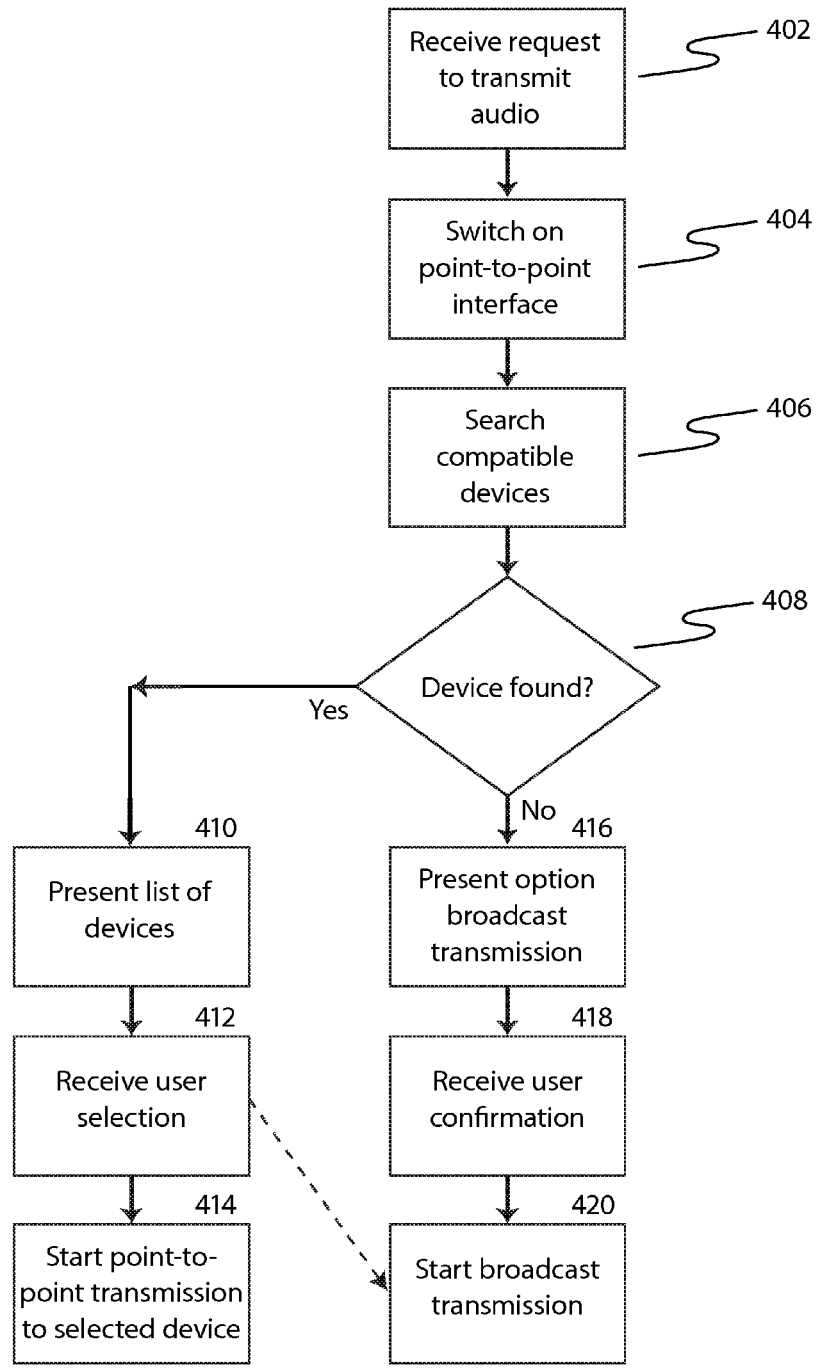

APPARATUS AND METHOD FOR TRANSMISSION OF AUDIO SIGNALS

TECHNICAL FIELD

The present application relates generally to transmission of audio signals.

BACKGROUND

As digital storage becomes more and more ubiquitous, users store media data increasingly on mobile and fixed devices that are connectable to or a part of a media replaying device. Especially, in the case of mobile devices like MP3-players or mobile video players, users may connect their devices to a home multimedia center, a home video system, a home stereo system or a car stereo system to replay media data stored on the device. Wireless connections are available as an alternative or in addition to cable connections.

Many kinds of devices are available that can store music or other audio files or that provide audio streaming. In addition to playback devices like MP3-players or CD-players, there are mobile devices that contain an audio player application in addition to a number of further applications like a mobile phone, a camera etc. For example, a number of mobile phone models contain an audio player (for example an MP3 player) or a video player. Further, also mobile computers like laptops are used to store and replay music or audio collections.

Audio can be stored in a large variety of digital and analogue formats. For example, the audio may be stored in a memory in a digitally coded form like MP3, Ogg Vorbis, AAC (advanced audio coding) or PCM (pulse code modulation), or it may be received through a wireless or wired connection such as a mobile or fixed line internet connection in a digital form.

Mobile devices often do not have high quality loudspeakers due to their size constraints. Their power typically comes from small batteries and they cannot support high quality loudspeakers for a long time. The preferred listening method for a mobile apparatus may be by headphone. However, a user may want to listen to his audio or music collection at home with the home stereo system or in a car through the car stereo system. Different connectors may be needed for cable connections, and therefore more than one cable may be needed for connecting the mobile device to more than one other device. A cable connection may break under mechanical stress. Instead, a wireless connection may be used. For example, stereo audio may be transmitted from a mobile device through a Bluetooth™ connection using A2DP (advanced audio distribution profile). A2DP is defined in the Bluetooth™ specification.

Apart from Bluetooth™, several short range radio systems may provide a wireless connection for media transfer. Point-to-point transmission systems (like WLAN or WiMAX) and broadcasting and/or multicasting may be used. In the area of broadcasting, there are analogue and digital transmission systems. FM (frequency modulation) transmission is an analogue transmission using licensed radio frequencies. FM receivers can be found in many homes, in many car stereo systems and also in a number of mobile devices. In addition, unlicensed low power FM transmission is now allowed in many countries including the United States of America, where this is regulated in FCC rule 15.

In unlicensed FM transmissions, the audio player "mimics" a conventional FM radio station and transmits the audio data encoded as a standard FM radio broadcast transmission. Additional features that are defined for FM transmissions, like RDS (radio data system), can be used in unlicensed FM transmissions as well. Unlicensed FM transmitters can be used in the car or home environment in order to replay the stored audio content of the audio player on the car radio or home stereo system.

Examples of digital broadcast transmissions systems are DAB (digital audio broadcast), DMB (digital media broadcast), DVB (digital video broadcast), and MediaFLO™ (media forward link only).

An unlicensed transmitter (either analogue or digital) can "mimic" a conventional licensed transmitter, so that the digital transmission can be received by a receiver, for example a receiver designed to receive transmissions from a licensed transmitter of the system.

Devices may be equipped with more than one transmitter/receiver in order to provide communication capability for different requirements, like different data rates, but also to provide for increased availability. A mobile device may comprise a Bluetooth™ interface, an FM transmitter/receiver, an infrared interface, a WLAN interface and a DVB-H transmitter/receiver in addition to a cellular interface like GSM (global system for mobile communications).

SUMMARY

Various aspects of the invention are set out in the claims.

In accordance with an example embodiment of the present invention, a method is provided comprising searching on a first communication interface for at least one device capable of a point-to-point transmission of media data. If a device is not selected for the point-to-point transmission, transmission of the media is started on a second communication interface using a broadcast transmission. Searching for the at least one device may be limited in time. A device may not be selected for the point-to-point transmission as no device was found by the search. Further a device may not be selected even if at least one device was found during the search. In such a case, a selection of the broadcast transmission may be received, for example from a user interface by a user input, or no selection may be received at all. In an example embodiment, if no selection is received, transmission of the media data may be started on the second communication interface using a broadcast transmission after a timeout.

In an example embodiment, in car and home entertainment audio equipment may be equipped with a point-to-point HiFi Stereo digital audio link over Bluetooth™. For high quality audio transmission over Bluetooth™ the "Advanced Audio Distribution Profile" may be used, known as A2DP. A person or a device that wishes to wirelessly transmit audio to one of these types of equipment may do so using Bluetooth™. However, this technology is not always available, and searching for at least one device on the Bluetooth™ interface (using for example a Bluetooth™ inquiry procedure) may not always be successful. So, an alternative connection method may be used, for example a broadcasting transmission like FM-transmission (FMTx) may be used as a fallback solution. The alternative broadcasting transmission may be selected after confirmation by a user or automatically without any user confirmation or selection.

In accordance with another example embodiment of the present invention, an apparatus is provided comprising a first communication interface capable of a point-to-point transmission of media data, for example a Bluetooth™, WLAN or WiMAX communication interface. Further, the apparatus comprises a second communication interface capable of a broadcast transmission, for example an FM transmitter or a DAB transmitter. The apparatus also comprises a control unit configured to receive a selection of a device with which a communication shall be initiated for transmission of media data on the first communication interface, and if said selection is not received, the control unit is configured to transmit the media data on the second communication interface using the broadcast transmission.

In certain embodiments, the device is a mobile phone, a PDA or a laptop. Such devices may have Bluetooth™ A2DP and FMTx technology fitted. If such a device wants to transmit an audio file or an audio stream to at least one other device (for example a car stereo system, a home stereo system or another mobile device), it may first try to find the at least one other device by using the Bluetooth™ discovery procedure. If the at least one other device is found, a service discovery is performed to see whether the at least one other device supports A2DP for high quality audio transmission/reception. If the A2DP is supported on the device and the at least one other device, then transmission/streaming of the audio can start. If no such other device is found, then Bluetooth™ discovery is stopped. Further, Bluetooth™ may or may not be deactivated. In order to transmit the audio file or the audio stream the FM transmitter is activated. The audio file/stream is converted to an analogue signal (if needed), modulated and transmitted as an FM signal from the unlicensed FM transmitter. As the transmission is done on a broadcast carrier and as no feedback channel exists for FM transmission, it cannot be assured that the FM transmission is actually received by the intended receiver.

In accordance with an example embodiment of the present invention, the device comprises a user interface, for example a keypad, a touch screen or a voice detection for detecting voice commands. One or more other devices found by Bluetooth™ discovery may be presented on a display or screen. The user interface is configured to generate a signal that corresponds to a user input interpreted as a selection of a device. In the example embodiment, the selection of the point-to-point transmission is based at least in part on the signal from the user interface.

In accordance with another example embodiment of the present invention, the control unit of the device is further configured to list found devices that are capable of a point-to-point transmission of media data at least in part based on an estimated distance. The control unit may be configured to estimate the distance based on a received signal strength or on a signal delay. The list indicating the estimated distance may be presented on a screen or display.

In certain embodiments the device or apparatus comprises a memory to store at least one predetermined setting for the selection of the point-to-point transmission. The control unit will then present the predetermined setting in a highlighted position for example on a display, or it will automatically make a selection based at least in part on the predetermined setting.

In further aspects of the present invention, there are provided a computer program product and a computer readable medium storing one or more computer readable instructions that, when executed cause a processor to perform a method comprising searching on a first communication interface for at least one device capable of a point-to-point transmission of media data. If a device is not selected for the point-to-point transmission, transmission of the media is started on a second communication interface using a broadcasting transmission.

In a further aspect, an apparatus is provided comprising a first means for communication capable of a point-to-point transmission of media data, and a second means for communication capable of a broadcast transmission. Further, there is provided a means for controlling configured to receive a selection of at least one device with which a communication shall be initiated for transmission of media data using the first means for communication. If said selection is not received, the piece of media data is transmitted using the second means for communication in the broadcast transmission.

BRIEF DESCRIPTION OF THE DRAWINGS

For a more complete understanding of example embodiments of the present invention, reference is now made to the following descriptions taken in connection with the accompanying drawings in which:

FIG. 4 shows a flow diagram of a method in accordance with an example embodiment of the invention.

DETAILED DESCRIPTION OF THE DRAWINGS

An example embodiment of the present invention and its potential advantages are best understood by referring to FIGS. 1 through 4 of the drawings.

The following description describes example embodiments of the invention using Bluetooth™ for the point-to-point transmission on the first communication interface and using FM transmitter for the broadcast transmission on the second communication interface. However, it is to be noted that the invention is not limited to Bluetooth™ and FM radio transmission technology for the first and second communication interface, respectively, but may be used in connection with other analog or digital transmission technologies like W-LAN, Wi-Fi, WIMAX etc. as point-to-point transmissions on the first communication interface and for example DAB, DMB or DVB as broadcast transmissions on the second communication interface.

Figure 1:
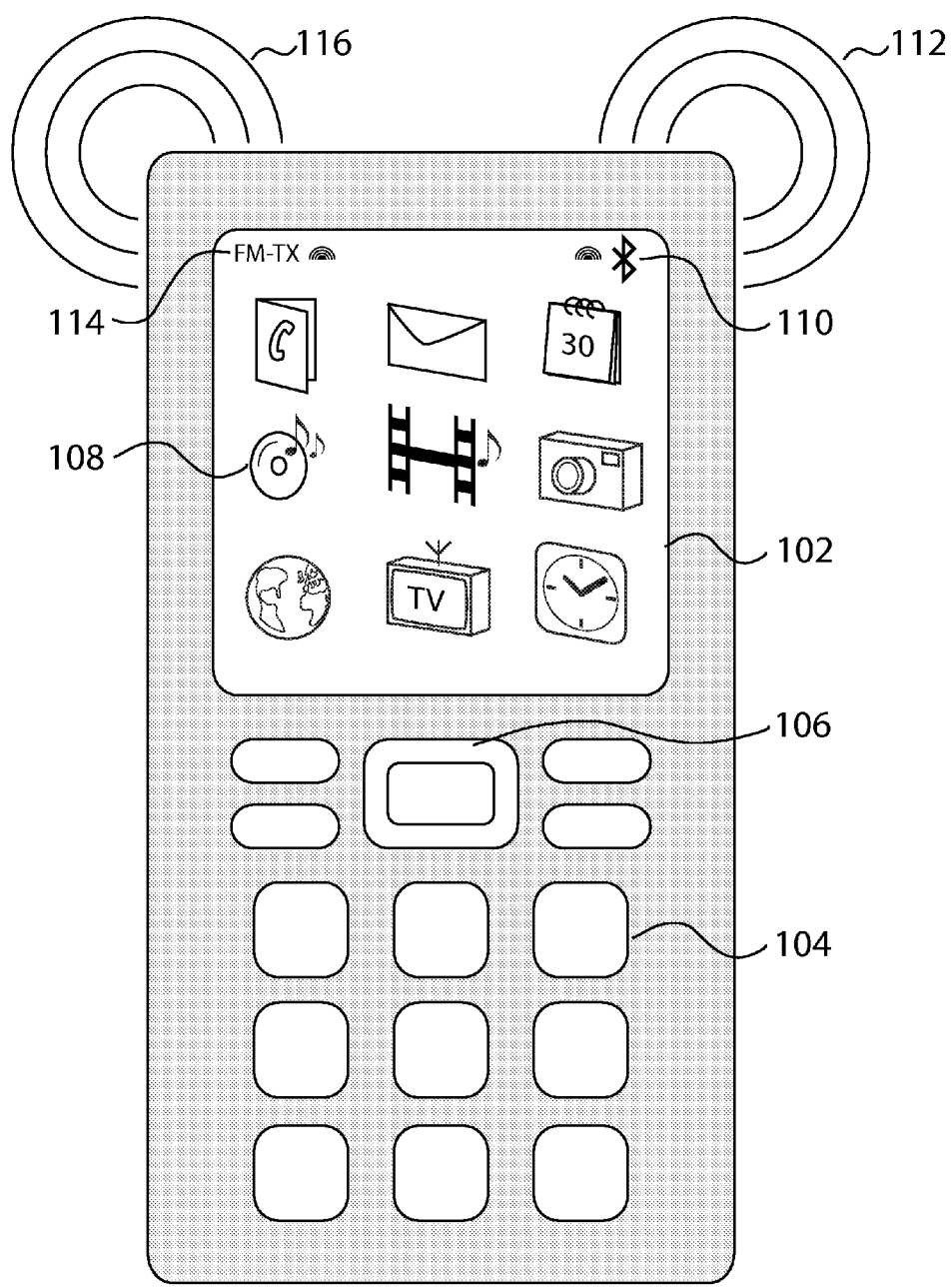
FIG. 1 shows an embodiment of an example apparatus according to the invention.

FIG. 1 shows an example embodiment of an apparatus 100, for example a mobile device, comprising a number of applications which are shown in a display 102. In the example embodiment, the applications comprise a telephone application which may comprise a phone directory. The applications may further comprise a messaging application, a calendar, a gallery, a camera, an internet browser, a mobile TV application and a clock. Further, the example apparatus 100 comprises an audio player application 108. The audio player application may be activated and controlled by a keypad 104. Keypad 104 may comprise a navigator key 106.

Further, the example apparatus 100 may comprise a first communication interface, for example a Bluetooth™ interface. Icon 110 in display 102 may indicate an activity of the Bluetooth™ interface. The Bluetooth™ signal is further illustrated by waves 112. Apparatus 100 may also comprise a broadcasting interface, like an FM transmitter. Icon 114 in display 102 shows an activity of the FM transmitter. The FM transmission signal is illustrated by waves 116. Icons 110 and 114 may be static or animated in order to indicate an activity of the respective interface.

The Bluetooth™ interface and the FM transmitter may be active one at a time, both together or none of them. Audio player 108 may use the Bluetooth™ interface or the FM transmitter to transmit a signal carrying audio data.

Figure 2:
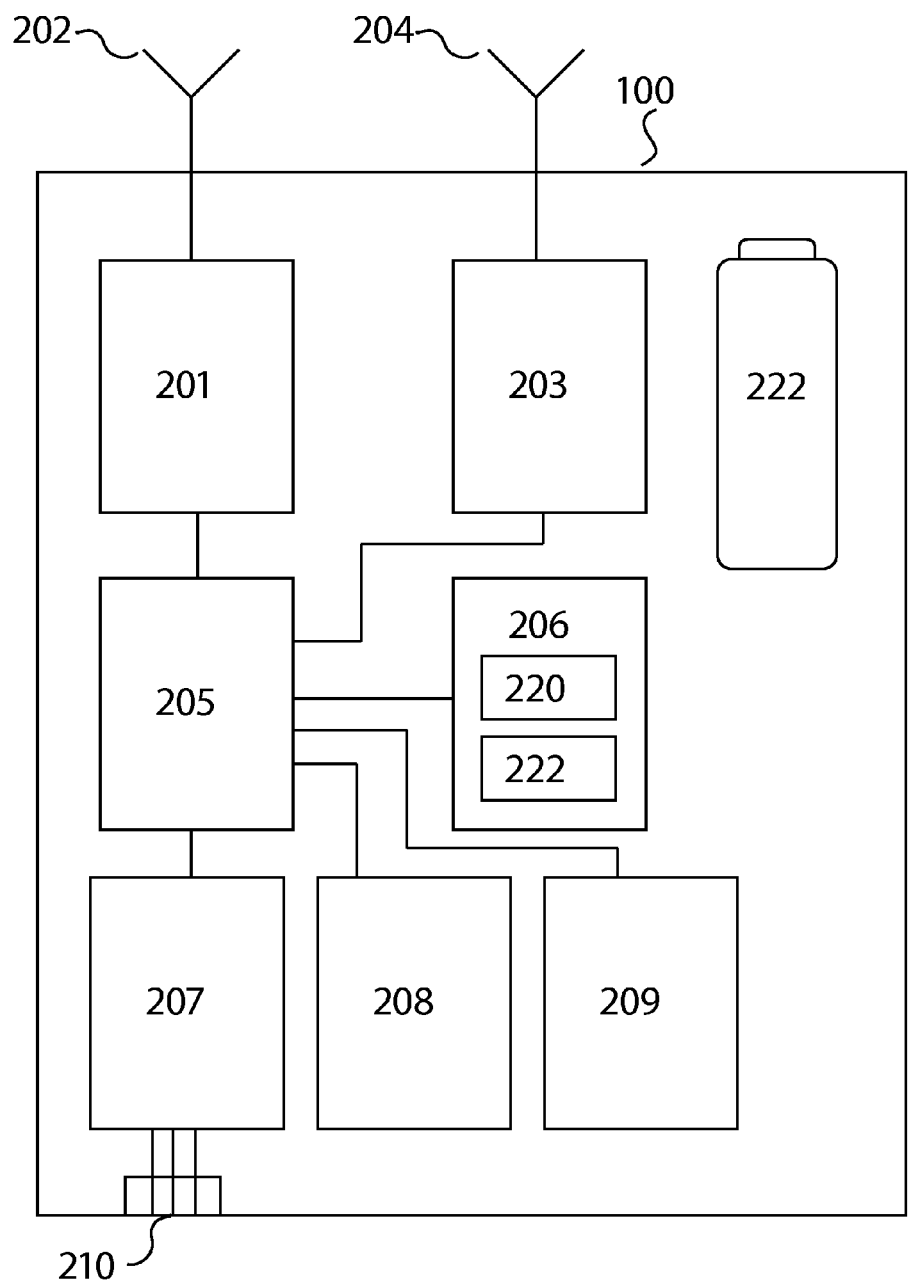
FIG. 2 shows a more detailed block diagram of an apparatus in accordance with an example embodiment of the invention.

FIG. 2 shows a more detailed block diagram of an apparatus in accordance with an example embodiment of the invention. Bluetooth™ transceiver 201 is connected to antenna 202, FM transmitter 203 is connected to antenna 204. Bluetooth™ transceiver 201 and FM transmitter 203 may also be connected to a single antenna for transmitting and receiving both Bluetooth™ and FM radio signals. Both the Bluetooth™ transceiver 201 and the FM transmitter 203 are controlled by controller 205 which also provides the data to the transceiver 201 and transmitter 203, for example audio data for transmission. Audio data may be stored in an area 220 of memory 206. Memory 206 may further comprise code with instructions for controller 205 in a second area 222. In addition, the example apparatus 100 may further comprise an interface block 207 coupled to connector 210, a display 208 and a keypad 209.

In order to facilitate communication between two or more devices, for example a mobile device and a home entertainment audio equipment, a common communication interface that is supported by the two or more devices has to be found. If one device wants to transmit data by WLAN transmission, another device has to be capable of WLAN reception. If one device comprises an FM-transmitter, another device comprises an FM-receiver in order to facilitate communication.

FIGS. 3A-3D show a mobile apparatus performing a method according to an example embodiment of the invention. A user using the audio player 108 of device 100 wants to listen to the audio in the car environment using the car stereo system.

Figure 3A:
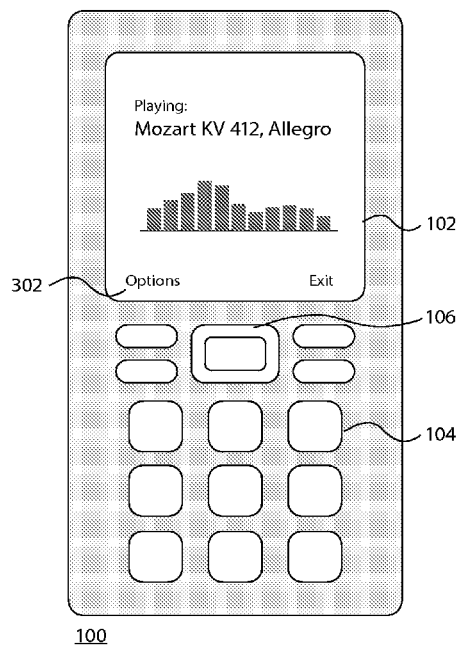
FIGS. 3A-3D show a mobile apparatus performing a method according to an example embodiment of the invention.
Figure 3B:
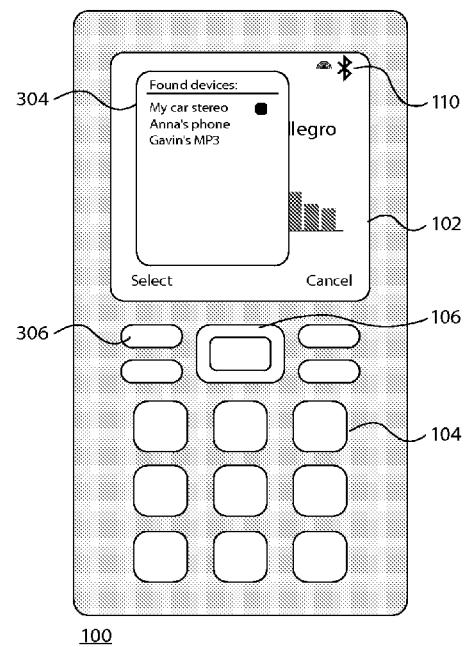

In an embodiment of the invention, an option "Transmit audio" may be selected. This option may be available in an "Options" menu 302 of the device 100, shown in FIG. 3A. The device activates for example the Bluetooth™ transceiver 201, and upon activation of transceiver 201, device 100 may perform an inquiry in order to find other Bluetooth™ devices. FIG. 3B shows the active Bluetooth™ interface with icon 110 on display 102. Further, the found devices may be scanned to determine whether they support A2DP (advanced audio distribution profile). If the scanned devices support A2DP, then this indicates that the devices support a stereo audio transfer to and from the device using Bluetooth™. The user may then be presented with a list of those discovered devices that support A2DP, shown as list 304. The user may navigate through the list of devices, for example with navigation key 106 from keypad 104, and select a device, for example the "My car stereo" of FIG. 3B, by pressing a select key 306. When the user has made the selection, audio is transmitted from device 100 by Bluetooth™ using the A2DP to the selected device.

Figure 3C:
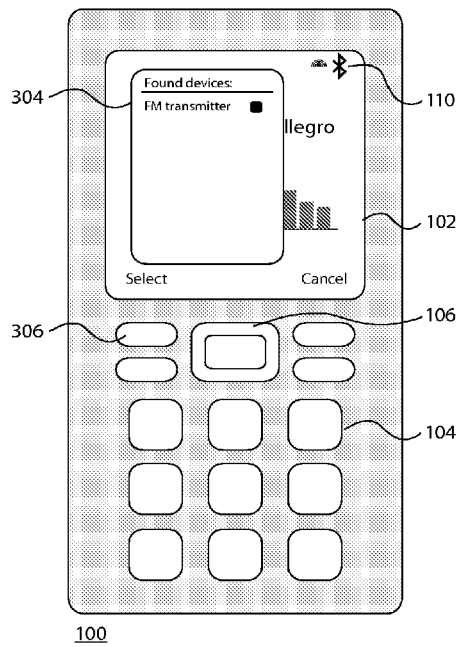

In case no Bluetooth™ device is found that supports A2DP, the list 304 may show a broadcast transmitter, e.g. the FM transmitter of FIG. 100, as shown in FIG. 3C. The user may select the FM transmitter and transmit the audio as an FM broadcast. Alternatively, the user may cancel the selection. If however the user selects the FM transmitter, the user may first be asked for a transmission frequency for the FM transmission. In an alternative embodiment, the user is presented with a list of frequencies, for example a list of scanned frequencies which have a low signal strength, indicating that the frequency is not occupied by another transmission. In a further alternative embodiment, such a frequency 310 is selected automatically by the device, and shown to the user, as displayed in FIG. 3D. In addition, in FIG. 3D the FM-TX activity icon 114 is shown indicating a broadcast transmission. If desired, Bluetooth™ may be switched off. Consequently, the Bluetooth™ icon 110 is not shown any more. The user may use the displayed frequency to tune the FM receiver of the car radio system to the selected frequency.

Figure 3D:
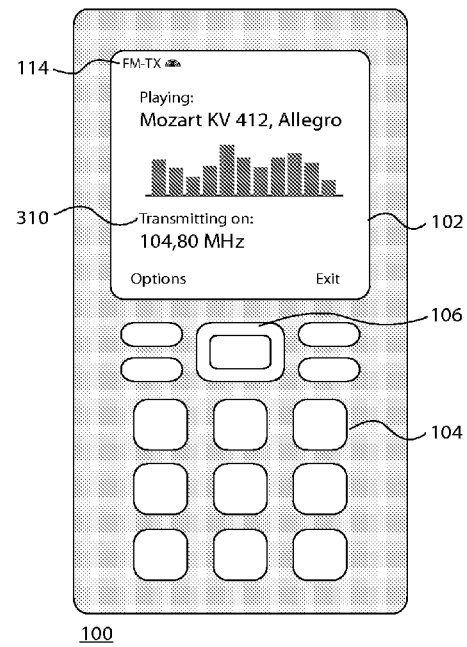

There may be several variations of the described method. These may for example differ in how far the process is automated and in how far user intervention is desired. In an example scenario, the user may use the device in two places, for example either in his/her private car or the company car. The car stereo system of his/her own car may be equipped with a Bluetooth™ transceiver supporting A2DP whereas the company car may not be. The car stereo system of the user's private car may be stored in apparatus 100 as a pre-determined setting. For example, the user may have stored the private car as a preferred device in apparatus 100. In such a scenario, the user may select the "Transmit audio" option of FIG. 3A. If the preferred device, for example the Bluetooth™ transceiver of the user's car, is found within a predefined time limit, the user is not presented with a selection, but a Bluetooth™ connection is established automatically and audio transmission is started without any further user intervention. If the preferred device is not found within the predefined time limit, for example in the company car, then the FM transmitter is activated and transmission using FM broadcast is started automatically. Also in this case, the FM transmission frequency may be indicated to the user as shown in FIG. 3D.

In a further embodiment, an FM transmission frequency may be predefined, so that it is checked first to see whether it is free, meaning that it is not occupied by another transmission. Thus, the same frequency is the default frequency and will be used at many occasions when the company car is used. In the corresponding FM receiver of the company car, the default frequency may be stored as one of the preferred radio station frequencies, for example as the frequency that the radio is tuned to when a user presses one of the program buttons of the FM receiver.

In this way, audio transmission may be set up both in the private car, by automatically connecting to the preferred Bluetooth™ device, and in the company car, by automatically using FM transmission, since the preferred Bluetooth™ device is not found, and since a predefined FM transmission frequency is used.

In a further embodiment, the list 304 of FIG. 3B is sorted according to an estimate of the distance of the found devices. In an example embodiment, nearby devices are listed first, and remote devices are listed last. It may be more likely, that the device with which the user wants to connect is close, so it may be preferred that the closest device appears at the top of the list 304 and can therefore be selected quickly. The distance may be estimated in many ways, for example by the received signal strength of the corresponding signal, or by a measured time delay of the transmission signal of a found device. The order of the list may be configured in any way, such as closest device last, in an alphabetical order, based on a quality of the signal, or in any other order.

In a further embodiment, the user may store favorite devices in the memory of apparatus 100. If such a favorite device is found, it will appear on top of the list. Other devices may be listed based on some other criteria, for example they may be sorted by distance or appear in the sequence they were discovered.

FIG. 4 shows a flow diagram of a method 400 in accordance with an example embodiment of the invention. At block 402, a request to transmit audio is received, for example from a user selection in the options menu of an audio player. The request to transmit audio may be received by apparatus 100. At block 404, an interface for point-to-point transmission is switched on. If the point-to-point interface is already switched on, then block 404 is skipped. At block 406 a device search is performed for compatible devices supporting high quality audio transmission, like Bluetooth™ A2DP. If such a device is found at block 408, then at block 410 a list of devices is shown, for example on a display 102. At block 412, a selection is received, for example from a user. At block 414, audio transmission starts using the point-to-point interface.

If no device is found at block 408, then the option to use a broadcast transmission is presented at block 416. At block 418, a confirmation is received, for example by a key press from a user. At block 420, broadcast transmission of the audio is started.

In an embodiment, the option of the broadcast transmission is shown even if one or more devices are found at block 408. Thus, the list of devices presented at block 410 comprises an additional entry of the broadcast transmission. If the user selects this option at block 412, the method continues at block 420 (shown by a dashed line) and broadcast transmission is started.

While embodiments of the invention have mainly been described in the combination of a mobile telephone comprising Bluetooth™ and an FM transmitter, it is not limited to this particular combination, nor is it limited to pure audio players. For the artisan many other useful combinations should be apparent. Just as an example, a mobile computer may have a mobile television application like DVB-H or MediaFLO™ that generates an audio signal. Only the audio of the mobile television application may then be transmitted using Bluetooth™ or FM transmission.

Instead of a Bluetooth™ connection using A2DP a different point-to-point audio connection may be used that supports stereo audio, for example based on WLAN, WiMAX or Wifi. Further, instead of FM transmission any other digital or analogue broadcast transmission suitable for unlicensed low power transmission may be used, for example DAB, DMB or MediaFLO™. Many other combinations of interfaces may be conceivable without departing from the idea of the invention.

In accordance with various embodiments of the present invention, a computer may run one or more software modules designed to perform one or more of the above-described operations. Such modules might, for example, be programmed using languages such as Java, Objective C, C, C#, C++, Perl, Python, C-Omega and/or the like according to methods known in the art. It is noted that any described division of operations among particular software modules is for purposes of illustration, and that alternate divisions of operation may be employed. Corresponding program code might be placed on computer-readable media. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may be, for example, DVD, CD-ROM, memory card, and/or floppy disk.

Various operations and/or the like described herein may, in various embodiments, be implemented in hardware (for example via one or more integrated circuits). For instance, in various embodiments various operations and/or the like described herein may be performed by specialized hardware, and/or otherwise not by one or more general purpose processors. One or more chips and/or chipsets might, in various embodiments, be employed. In various embodiments, one or more Application-Specific Integrated Circuits (ASICs) may be employed.

If desired, the different functions discussed herein may be performed in any order and/or concurrently with each other.

Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
 activating a first wireless communication interface supporting a predetermined audio distribution profile of a point-to-point media data communication interface and performing an inquiry to find other wireless devices supporting the predetermined audio distribution profile of the point-to-point media data communication interface;
 determining via operation employing the first wireless communication interface, an absence of other wireless devices supporting the predetermined audio distribution profile of the point-to-point media data communication interface;
 activating a second wireless communication interface capable of media broadcast, in response to the determination of the absence of other wireless devices;
 determining, via operation employing the second communication interface, at least one unoccupied media broadcast frequency;
 determining to automatically select a one of said unoccupied media broadcast frequencies; and
 determining to media broadcast the media data, via the second communication interface, using the automatically selected frequency.

2. The method of claim 1, further comprising basing a selection for the point-to-point communication at least in part on a user input.

3. The method of claim 1, further comprising listing at least one device determined to support said point-to-point media data communication based at least in part on an estimated distance.

4. The method of claim 3, further comprising estimating the distance based at least in part on at least one of a received signal strength and a signal delay.

5. The method of claim 1, further comprising basing a selection for the point-to-point communication at least in part on a predetermined setting.

6. The method of claim 1, wherein the first communication interface is a Bluetooth™ interface.

7. The method of claim 6, wherein the Bluetooth™ interface uses an advanced audio distribution profile.

8. The method of claim 1, wherein the second communication interface comprises an FM transmitter.

9. The method of claim 1, wherein the second communication interface comprises a digital broadcast interface.

10. The method of claim 1, wherein the second communication interface comprises a DVB-H transmitter.

11. An apparatus comprising:
 a first wireless communication interface supporting a predetermined audio distribution profile of a point-to-point media data communication interface;

a second wireless communication interface capable of media broadcast;

a control unit configured to:

activate the first wireless communication interface to perform an inquiry to find other wireless devices supporting the predetermined audio distribution profile of the point-to-point media data communication interface;

determine via operation employing the first wireless communication interface, an absence of other wireless devices supporting the predetermined audio distribution profile of the point-to-point media data communication interface;

activate the second wireless communication interface, in response to the determination of the absence of other wireless devices;

determine, via operation employing the second wireless communication interface, at least one unoccupied media broadcast frequency;

determine to automatically select a one of said unoccupied media broadcast frequencies; and determine to media broadcast the media data, via the second communication interface, using the automatically selected frequency.

12. The apparatus of claim 11, further comprising a user interface configured to generate a signal corresponding to a selection of a device of found devices determined to support said point-to-point media data communication.

13. The apparatus of claim 11, wherein the control unit is further configured to list at least one device determined to support said point-to-point media data communication based at least in part on an estimated distance.

14. The apparatus of claim 13, wherein the control unit is further configured to estimate the distance based at least in part on at least one of a received signal strength and a signal delay.

15. The apparatus of claim 11, further comprising a memory to store at least one predetermined setting for a selection of the point-to-point communication.

16. The apparatus of claim 11, wherein the first communication interface is a Bluetooth™ interface.

17. The apparatus of claim 16, wherein the Bluetooth™ interface uses an advanced audio distribution profile.

18. The apparatus of claim 11, wherein the second communication interface comprises an FM transmitter.

19. The apparatus of claim 11, wherein the second communication interface comprises a digital broadcast interface.

20. The apparatus of claim 11, wherein the second communication interface comprises a DVB-H transmitter.

21. An apparatus comprising:

a first means for communication supporting a predetermined audio distribution profile of a point-to-point media data communication interface;

a second means for communication capable of media broadcast;

a means for controlling configured to:

activate the first means to perform an inquiry to find other wireless devices supporting the predetermined audio distribution profile of the point-to-point media data communication interface;

determine via operation employing the first means, an absence of other wireless devices supporting the predetermined audio distribution profile of the point-to-point media data communication interface;

activate the second means, in response to the determination of the absence of other wireless devices;

determine, via operation employing the second means for communication, at least one unoccupied media broadcast frequency;

determine to automatically select a one of said unoccupied media broadcast frequencies; and determine to media broadcast the media data, via the second means for communication, using the automatically selected frequency.

22. A computer program product comprising a non-transitory computer-readable medium bearing computer program instructions embodied therein for use with a computer, the computer program instructions comprising:

instructions configured to cause an apparatus to activate a first wireless communication interface supporting a predetermined audio distribution profile of a point-to-point media data communication interface and performing an inquiry to find other wireless devices supporting the predetermined audio distribution profile of the point-to-point media data communication interface;

instructions configured to cause the apparatus to determine via operation employing the first wireless communication interface, an absence of other wireless devices supporting the predetermined audio distribution profile of the point-to-point media data communication interface;

instructions configured to cause the apparatus to activate a second wireless communication interface capable of media broadcast, in response to the determination of the absence of other wireless devices;

instructions configured to cause the apparatus to determine, via operation employing the second wireless communication interface, at least one unoccupied media broadcast frequency;

instructions configured to cause the apparatus to determine to automatically select a one of said unoccupied media broadcast frequencies; and instructions configured to cause the apparatus to determine to media broadcast, via the second communication interface, using the automatically selected frequency.

23. A non-transitory computer-readable medium encoded with instructions that, when executed by a computer, perform:

activating a first wireless communication interface supporting a predetermined audio distribution profile of a point-to-point media data communication interface and performing an inquiry to find other wireless devices supporting the predetermined audio distribution profile of the point-to-point media data communication interface;

determining via operation employing the first wireless communication interface, an absence of other wireless devices supporting the predetermined audio distribution profile of the point-to-point media data communication interface;

activating a second wireless communication interface capable of media broadcast, in response to the determination of the absence of other wireless devices;

determining, via operation employing the second wireless communication interface, at least one unoccupied media broadcast frequency;

determining to automatically select a one of said unoccupied media broadcast frequencies; and determining to media broadcast the media data, via the second communication interface, using the automatically selected frequency.

24. The computer-readable medium of claim 23, further encoded with instructions that, when executed by a computer, further perform a selection for the point-to-point communication based at least in part on a predetermined setting.

25. A chipset comprising at least one controller module, the controller module being configured to:
- activate a first wireless communication interface supporting a predetermined audio distribution profile of a point-to-point media data communication interface and perform an inquiry to find other wireless devices supporting the predetermined audio distribution profile of the point-to-point media data communication interface;
- determine via operation employing the first wireless communication interface, an absence of other wireless devices supporting the predetermined audio distribution profile of the point-to-point media data communication interface;
- activate a second wireless communication interface capable of media broadcast, in response to the determination of the absence of other wireless devices;
- determine, via operation employing the second wireless communication interface, at least one unoccupied media broadcast frequency;
- determine to automatically select a one of said unoccupied media broadcast frequencies; and
- determine to media broadcast the media data, via the second communication interface, using the automatically selected frequency.

26. The chipset of claim 25, wherein the first communication interface is a Bluetooth™ interface, and the second communication interface is an FM transmitter.

* * * * *